United States Patent
Shono et al.

(10) Patent No.: US 12,554,636 B2
(45) Date of Patent: Feb. 17, 2026

(54) MEMORY SYSTEM AND METHOD OF CONTROLLING MEMORY SYSTEM

(71) Applicant: Kioxia Corporation, Tokyo (JP)

(72) Inventors: Atsuo Shono, Kamakura Kanagawa (JP); Kazuhiro Fukutomi, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/886,391

(22) Filed: Sep. 16, 2024

(65) Prior Publication Data

US 2025/0272231 A1    Aug. 28, 2025

(30) Foreign Application Priority Data

Feb. 22, 2024   (JP) ................................. 2024-025710

(51) Int. Cl.
*G06F 12/02*    (2006.01)

(52) U.S. Cl.
CPC .. *G06F 12/0246* (2013.01); *G06F 2212/7201* (2013.01)

(58) Field of Classification Search
CPC ....................... G06F 12/0246; G06F 2212/7201
See application file for complete search history.

(56) References Cited

U.S. PATENT DOCUMENTS

| | | | | |
|---|---|---|---|---|
| 9,600,184 | B2* | 3/2017 | Flynn | G06F 3/067 |
| 11,010,054 | B1* | 5/2021 | Himelstein | G06F 3/0685 |
| 11,249,652 | B1* | 2/2022 | Kuzmin | G06F 3/061 |
| 11,586,385 | B1* | 2/2023 | Lercari | G06F 12/0246 |
| 2010/0217927 | A1* | 8/2010 | Song | G06F 3/0656 |
| | | | | 711/E12.001 |
| 2017/0185322 | A1* | 6/2017 | Stephens | G06F 12/128 |
| 2019/0042150 | A1* | 2/2019 | Wells | G06F 3/0611 |
| 2019/0361611 | A1 | 11/2019 | Hosogi et al. | |
| 2021/0089209 | A1 | 3/2021 | Asano et al. | |
| 2021/0294506 | A1 | 9/2021 | Tadokoro | |
| 2023/0236964 | A1* | 7/2023 | Kim | G06F 12/0891 |
| | | | | 711/170 |
| 2024/0094903 | A1* | 3/2024 | Kavirayani | G06F 3/0631 |

* cited by examiner

*Primary Examiner* — Rocio Del Mar Perez-Velez
*Assistant Examiner* — Kaitlyn H Pham
(74) *Attorney, Agent, or Firm* — Foley & Lardner LLP

(57) ABSTRACT

According to one embodiment, a memory system includes: a non-volatile memory; and a memory controller configured to allocate a logical address range to a namespace in a first unit and release the logical address range from the namespace in the first unit. The first unit includes one or more second units, and each of the one or more second units includes a plurality of third units. The memory controller, in response to a first command from a host giving an instruction on invalidation of data stored in a first logical address range designating one or more of the third units, is configured to: invalidate the data for each of the one or more third units; and manage, for each of the one or more second units, a first count that is a number of third units in which valid data is stored among the plurality of third units.

16 Claims, 16 Drawing Sheets

Logical address space
|  |  |  | CST0 |
|---|---|---|---|
| NSAU0 | VCCU0 | SEG0 | CST1 |
|  |  |  | ⋮ |
|  |  |  | CST0 |
|  |  | SEG1 | CST1 |
|  |  |  | ⋮ |
|  |  | ⋮ |  |
|  | VCCU1 | SEG0 | CST0 |
|  |  |  | CST1 |
|  |  |  | ⋮ |
|  |  | SEG1 | CST0 |
|  |  |  | CST1 |
|  |  |  | ⋮ |
|  |  | ⋮ | ⋮ |
| NSAU1 | ⋮ | ⋮ | ⋮ |
| ⋮ | ⋮ | ⋮ | ⋮ |
F I G. 3
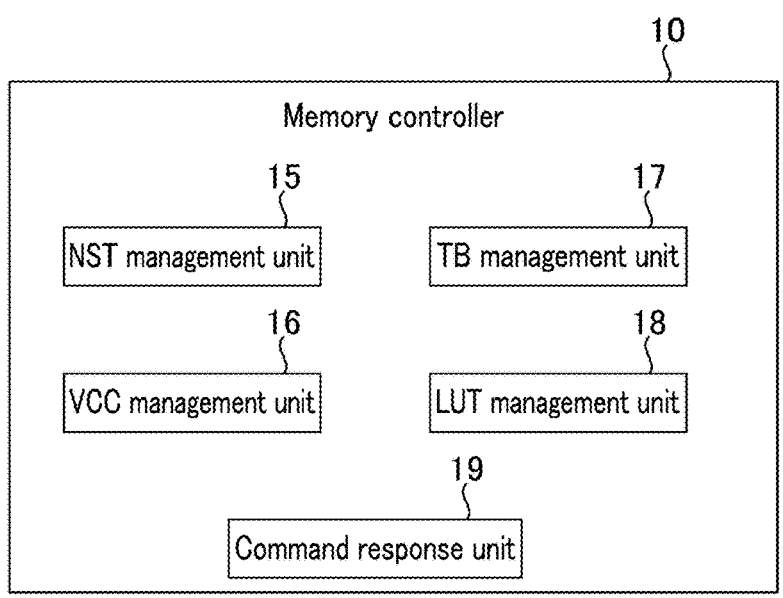
F I G. 4

| NSID | NSAUID |
|---|---|
| NS0 | NSAU0 |
| | NSAU2 |
| | invalid |
| | ⋮ |
| NS1 | NSAU1 |
| | invalid |
| | invalid |
| | ⋮ |
| ⋮ | ⋮ |

F I G. 5

| | | | | LUT entries (34) | TB (33) | VCC (32) |
|---|---|---|---|---|---|---|
| NSAU 0 | VCCU 0 | SEG0 | CST0 | PA0 | 0 | 1 |
| | | | CST1 | invalid | | |
| | | SEG1 | CST0 | PA1 | 1 | |
| | | | CST1 | invalid | | |
| | | ⋮ | | | | |
| | VCCU 1 | SEG0 | CST0 | PA2 | 0 | 2 |
| | | | CST1 | invalid | | |
| | | SEG1 | CST0 | PA3 | 0 | |
| | | | CST1 | invalid | | |
| | | ⋮ | | | | |

Logical address space

F I G. 6

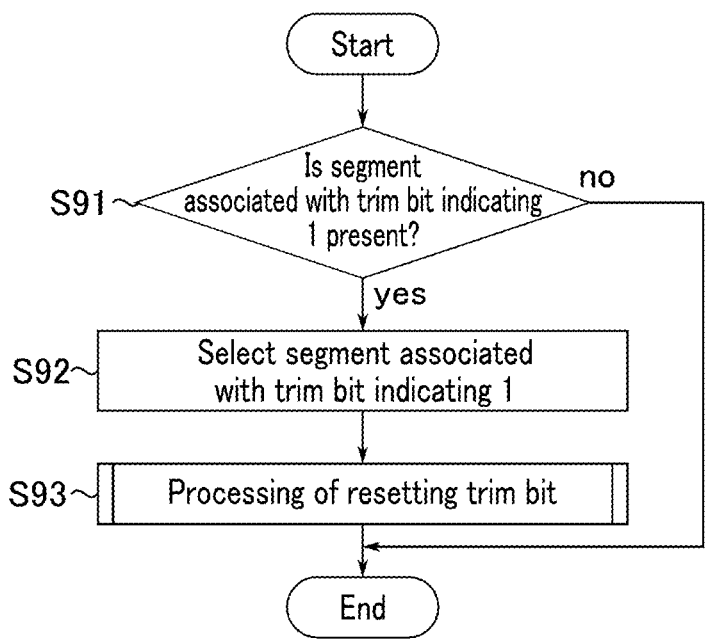
F I G. 13

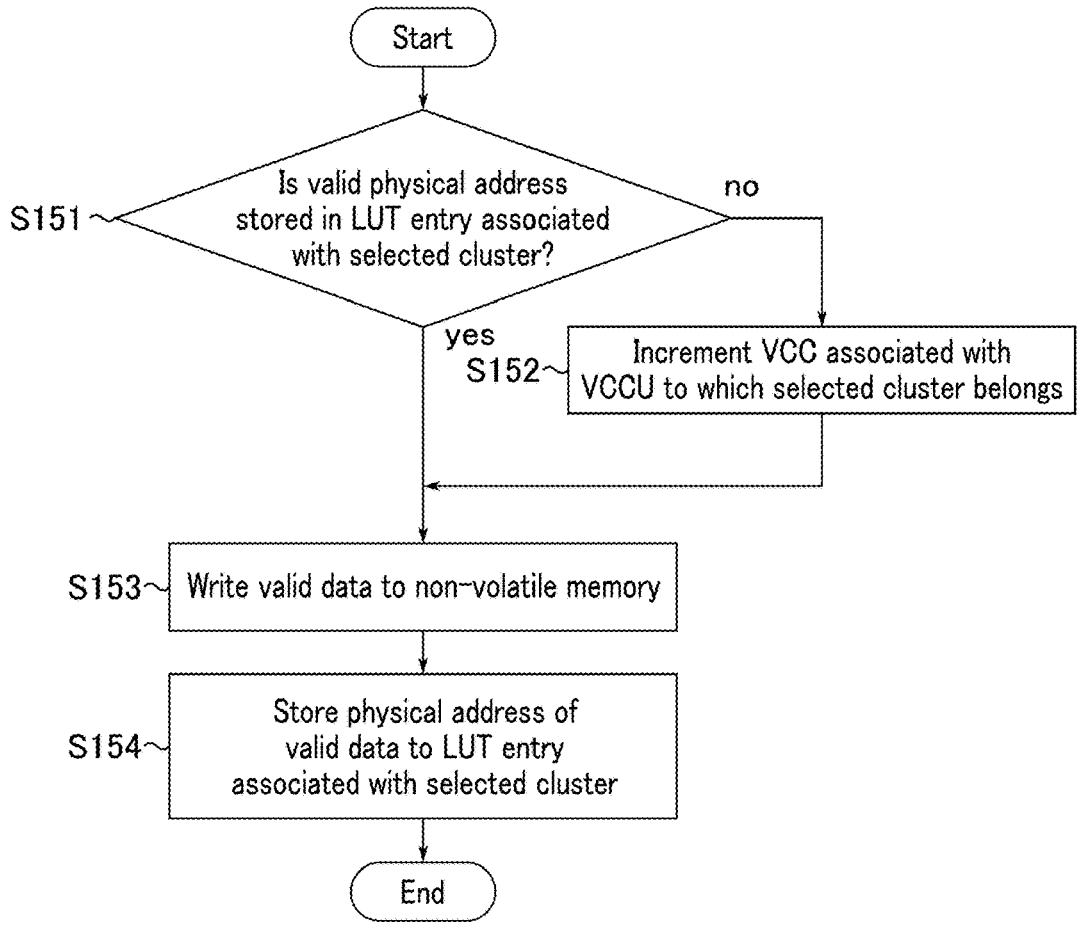
F I G. 16
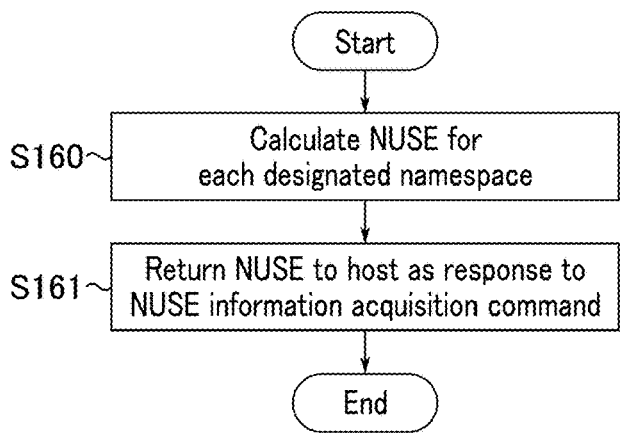
F I G. 17

| Logical address space | | | | | VCC (32) | TB (33) | LUT entries (34) |
|---|---|---|---|---|---|---|---|
| NSAU 0 | VCCU 0 | SEG0 | CST0 | Internal trim range | 1→0 | 0→1 | valid |
| | | | CST1 | | | | invalid |
| | | SEG1 | CST0 | | | 1 | valid |
| | | | CST1 | | | | invalid |
| | VCCU 1 | SEG0 | CST0 | | 2 | 0 | valid |
| | | | CST1 | | | | invalid |
| | | SEG1 | CST0 | | | 0 | valid |
| | | | CST1 | | | | invalid |

FIG. 18

| Logical address space | | | | | VCC (32) | TB (33) | LUT entries (34) |
|---|---|---|---|---|---|---|---|
| NSAU 0 | VCCU 0 | SEG0 | CST0 | | 1 | 0 | valid |
| | | | CST1 | | | | invalid |
| | | SEG1 | CST0 | | | 1 | valid |
| | | | CST1 | | | | invalid |
| | VCCU 1 | SEG0 | CST0 | Internal trim range | 2→1 | 0→1 | valid |
| | | | CST1 | | | | invalid |
| | | SEG1 | CST0 | | | 0 | valid |
| | | | CST1 | | | | invalid |

FIG. 19

| Logical address space | | | | | VCC (32) | TB (33) | LUT entries (34) |
|---|---|---|---|---|---|---|---|
| NSAU 0 | VCCU 0 | SEG0 | CST0 | | 1 | 0 | valid |
| | | | CST1 | | | | invalid |
| | | SEG1 | CST0 | | | 1 | valid |
| | | | CST1 | | | | invalid |
| | VCCU 1 | SEG0 | CST0 | | 2→1 | 0 | valid |
| | | | CST1 | Internal trim range | | | invalid |
| | | SEG1 | CST0 | | | 0 | valid→invalid |
| | | | CST1 | | | | invalid |

F I G. 20

| Logical address space | | | | | VCC (32) | TB (33) | LUT entries (34) |
|---|---|---|---|---|---|---|---|
| NSAU 0 | VCCU 0 | SEG0 | CST0 | | 1 | 0 | valid |
| | | | CST1 | | | | invalid |
| | | SEG1 | CST0 | Internal trim range | | 1→0 | valid→invalid |
| | | | CST1 | | | | invalid |
| | VCCU 1 | SEG0 | CST0 | | 2 | 0 | valid |
| | | | CST1 | | | | invalid |
| | | SEG1 | CST0 | | | 0 | valid |
| | | | CST1 | | | | invalid |

F I G. 21

| Logical address space | | | | VCC (32) | | TB (33) | LUT entries (34) |
|---|---|---|---|---|---|---|---|
| NSAU 0 | VCCU 0 | SEG0 | CST0 | 1 | Internal write range | 0 | valid |
| | | | CST1 | | | | invalid |
| | | SEG1 | CST0 | | | 1→0 | valid→invalid |
| | | | CST1 | | | | invalid |
| | VCCU 1 | SEG0 | CST0 | 2 | | 0 | valid |
| | | | CST1 | | | | invalid |
| | | SEG1 | CST0 | | | 0 | valid |
| | | | CST1 | | | | invalid |

FIG. 22

| Logical address space | | | | VCC (32) | | TB (33) | LUT entries (34) |
|---|---|---|---|---|---|---|---|
| NSAU 0 | VCCU 0 | SEG0 | CST0 | 1→2 | Internal write range | 0 | valid |
| | | | CST1 | | | | invalid |
| | | SEG1 | CST0 | | | 0 | invalid |
| | | | CST1 | | | | invalid→valid |
| | VCCU 1 | SEG0 | CST0 | 2 | | 0 | valid |
| | | | CST1 | | | | invalid |
| | | SEG1 | CST0 | | | 0 | valid |
| | | | CST1 | | | | invalid |

FIG. 23

MEMORY SYSTEM AND METHOD OF CONTROLLING MEMORY SYSTEM

CROSS-REFERENCE TO RELATED APPLICATION

This application is based upon and claims the benefit of priority from Japanese Patent Application No. 2024-025710, filed Feb. 22, 2024, the entire contents of which are incorporated herein by reference.

FIELD

Embodiments described herein relate generally to a memory system and a method of controlling a memory system.

BACKGROUND

A memory system including a NAND flash memory as a non-volatile memory and a memory controller that controls the non-volatile memory is known. The memory controller manages whether data stored in the non-volatile memory is valid or invalid.

BRIEF DESCRIPTION OF DRAWINGS

FIG. 3 is a diagram illustrating an example of a configuration of a logical address space of the memory system according to the embodiment.

FIG. 4 is a block diagram illustrating an example of a functional configuration of a memory controller according to the embodiment.

FIG. 5 is a diagram illustrating an example of a data structure of a namespace table according to the embodiment.

FIG. 6 is a diagram illustrating an example of a relationship between the logical address space of the memory system according to the embodiment and each data structure of valid cluster count information, trim bit information, and a lookup table.

FIG. 13 is a flowchart illustrating an example of trim processing in the memory system according to the embodiment.

FIG. 16 is a flowchart illustrating an example of write processing in the memory system according to the embodiment.

FIG. 17 is a flowchart illustrating an example of a series of processing from receiving an NUSE information acquisition command to responding to the host in the memory system according to the embodiment.

FIG. 18 is a diagram illustrating a specific example of the valid cluster count information, the trim bit information, and the lookup table in a first case in the memory system according to the embodiment.

FIG. 19 is a diagram illustrating a specific example of the valid cluster count information, the trim bit information, and the lookup table in a second case in the memory system according to the embodiment.

FIG. 20 is a diagram illustrating a specific example of the valid cluster count information, the trim bit information, and the lookup table in a third case in the memory system according to the embodiment.

FIG. 21 is a diagram illustrating a specific example of the valid cluster count information, the trim bit information, and the lookup table in a fourth case in the memory system according to the embodiment.

FIG. 22 is a diagram illustrating a first specific example of the valid cluster count information, the trim bit information, and the lookup table in a fifth case in the memory system according to the embodiment.

FIG. 23 is a diagram illustrating a second specific example of the valid cluster count information, the trim bit information, and the lookup table in the fifth case in the memory system according to the embodiment.

DETAILED DESCRIPTION

In general, according to one embodiment, a memory system includes: a non-volatile memory; and a memory controller configured to allocate a logical address range to a namespace in a first unit and release the logical address range from the namespace in the first unit. The first unit includes one or more second units, and each of the one or more second units includes a plurality of third units. The memory controller, in response to a first command from a host giving an instruction on invalidation of data stored in a first logical address range designating one or more of the third units, is configured to: invalidate the data for each of the one or more third units; and manage, for each of the one or more second units, a first count that is a number of third units in which valid data is stored among the plurality of third units.

Hereinafter, embodiments will be described with reference to the drawings. In the following description, components having the same functions and configurations are denoted by the same reference signs. In addition, in a case where a plurality of components having a common reference sign is distinguished, suffixes are added to the common reference sign to distinguish the components from each other. In a case where a plurality of components does not need to be particularly distinguished, only a common reference sign is given to the plurality of components, and suffixes are not added to the common reference sign.

1. Configuration

1.1 Information Processing System

A configuration of an information processing system according to an embodiment will be described.

Figures 1, 2:
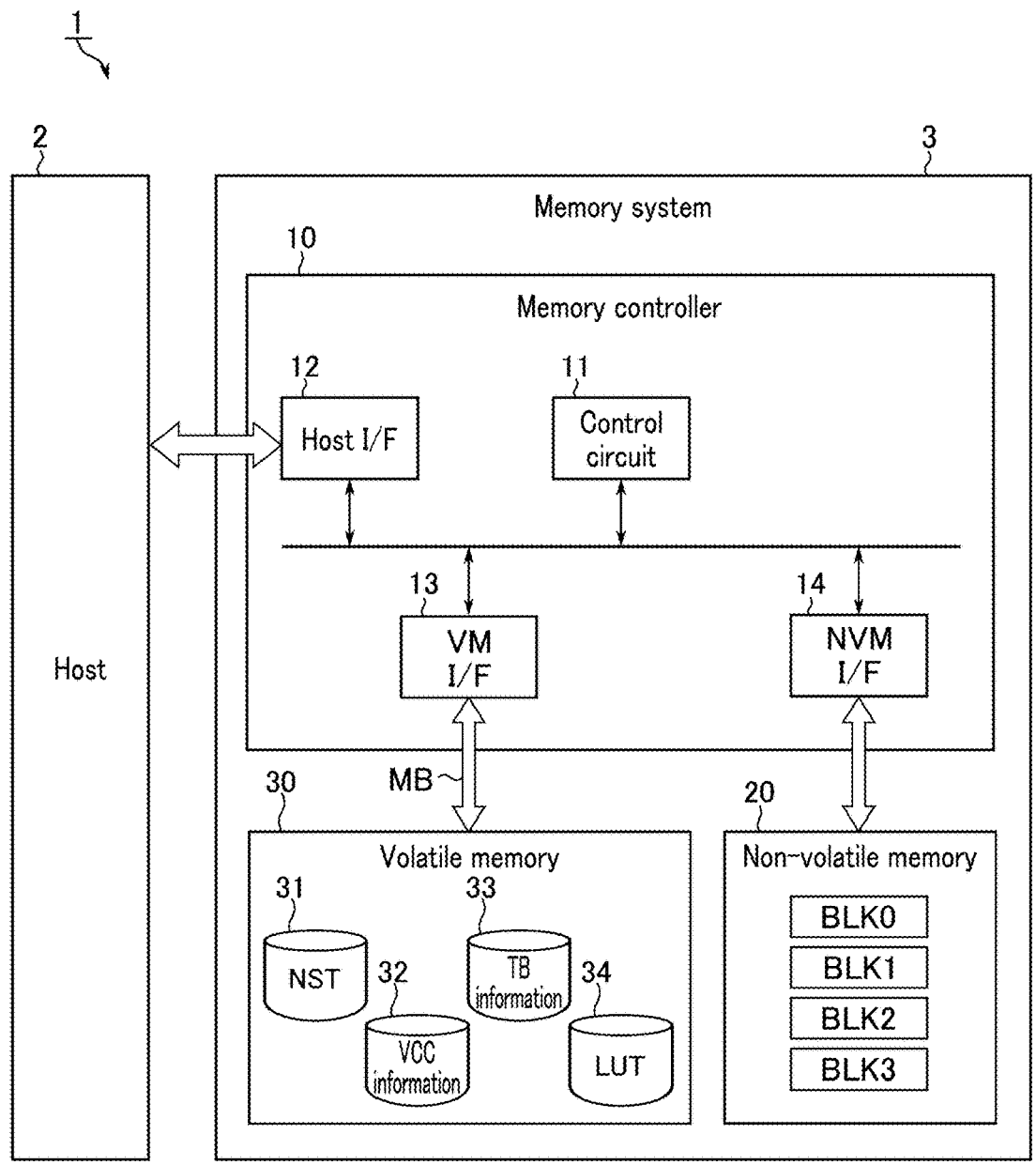
FIG. 1 is a block diagram illustrating an example of a configuration of an information processing system according to an embodiment.
FIG. 2 is a diagram illustrating an example of a configuration of a logical address used when a host according to the embodiment designates a memory space in a memory system.

FIG. 1 is a diagram illustrating an example of the configuration of the information processing system according to the embodiment. As illustrated in FIG. 1, the information processing system 1 includes a host 2 and a memory system 3.

The host 2 is a data processing device that performs processing such as writing, reading, and erasing of data using the memory system 3. The host 2 is, for example, a personal computer or a server in a data center. The host 2 uses a logical address to designate a memory address of the memory system 3.

The memory system 3 is a storage device configured to be connected to the host 2. The memory system 3 is, for example, a memory card such as an SD™ card, a universal flash storage (UFS), or a solid state drive (SSD). The memory system 3 has an internal logical address space as a memory space. The internal logical address space of the memory system 3 is, for example, a logical cluster address (LCA).

FIG. 2 is a diagram illustrating an example of a configuration of a logical address used by the host according to the embodiment. As illustrated in FIG. 2, the host 2 designates a memory address of the memory system 3 using a namespace identifier (NS ID) and an in-namespace (NS) address. The memory system 3 subdivides the in-NS address into a namespace allocation unit (NSAU) granularity upper address and an in-NSAU offset.

The NS ID is a bit string for identifying a namespace NS. The namespace NS is a subspace provided to the host 2 by logically dividing a space at an internal logical address (hereinafter, also simply referred to as a logical address) of the memory system 3. Ranges of in-NS addresses allocated to respective namespaces NS may be equal to each other or may be different from each other.

The NSAU granularity upper address is a bit string that designates a range of logical addresses in units of namespace allocation units NSAU. Each of the namespace allocation units NSAU is a subspace smaller than each of the namespaces NS. Each of the namespace allocation units NSAU is used, for example, as a unit for allocating and releasing the logical address space of the memory system 3 to and from the namespaces NS. Memory capacities allocated to the respective namespace allocation units NSAU are equal to each other.

The in-NSAU offset is a bit string that designates a predetermined logical address within the range designated by the NSAU granularity upper address.

FIG. 3 is a diagram illustrating an example of a configuration of the logical address space of the memory system according to the embodiment.

As illustrated in FIG. 3, the logical address space of the memory system 3 is divided into a plurality of namespace allocation units NSAU (NSAU0, NSAU1, . . . ). Each of the namespace allocation units NSAU is divided into a plurality of valid cluster count units VCCU (VCCU0, VCCU1, . . . ). Each of the valid cluster count units VCCU is divided into a plurality of segments SEG (SEG0, SEG1, . . . ). Each of the segments SEG is divided into a plurality of clusters CST (CST0, CST1, . . . ).

Each of the clusters CST is an execution unit of trim processing in the memory system 3. The trim processing may also be called unmap processing. The trim processing will be described later in detail.

Each of the segments SEG is a unit for postponing the trim processing in the memory system 3. Postponing the trim processing means that the memory system 3 suspends the execution of the trim processing although the memory system 3 receives a trim command from the host 2. The memory capacity of each of the segments SEG is larger than the memory capacity of each of the clusters CST.

Each of the valid cluster count units VCCU is a unit for managing the number of clusters CST storing valid data. The memory capacity of each of the valid cluster count units VCCU is not smaller than the memory capacity of each of the segments SEG and not larger than the memory capacity of each of the namespace allocation units NSAU.

1.2 Memory System

Next, an internal configuration of the memory system according to the embodiment will be described with reference to FIG. 1 again. The memory system 3 includes a memory controller 10, a non-volatile memory 20, and a volatile memory 30.

The memory controller 10 includes, for example, an integrated circuit such as a system on a chip (SoC). The memory controller 10 may include a plurality of semiconductor chips. The memory controller 10 controls the non-volatile memory 20 based on a request from the host 2.

Specifically, for example, the memory controller 10 executes write processing of writing data to the non-volatile memory 20 based on a write command from the host 2. In addition, the memory controller 10 executes trim processing of invalidating data written in the non-volatile memory 20 based on a trim command from the host 2. Then, the memory controller 10 notifies, in a timely manner, the host 2 of the amount of data that is valid for the host 2 among the data stored in the memory system 3. Hereinafter, data that is valid for the host 2 among the data stored in the memory system 3 is referred to as valid data. Data that is invalid for the host 2 among the data stored in the memory system 3 is referred to as invalid data.

The non-volatile memory 20 is, for example, a NAND flash memory. The non-volatile memory 20 includes a plurality of blocks BLK (BLK0 to BLK3). Each of the blocks BLK includes a plurality of memory cells. Each of the memory cells is a physical region that stores data in a non-volatile manner. The blocks BLK are, for example, units in which data is erased.

The volatile memory 30 is, for example, a dynamic random access memory (DRAM). The volatile memory 30 stores, for example, a namespace table (NST) 31, valid cluster count (VCC) information 32, trim bit (TB) information 33, and a lookup table (LUT) 34. Details of the information stored in the volatile memory 30 will be described later.

1.3 Memory Controller

Next, an internal configuration of the memory controller 10 will be described.

1.3.1 Hardware Configuration

First, a hardware configuration of the memory controller 10 will be described with reference to FIG. 1. The memory controller 10 includes a control circuit 11, a host interface circuit (host I/F) 12, a volatile memory interface circuit (VM I/F) 13, and a non-volatile memory interface circuit (NVM I/F) 14. Functions of the control circuit 11, the host interface circuit 12, the volatile memory interface circuit 13, and the non-volatile memory interface circuit 14 described below can be implemented by dedicated hardware, a processor that executes a program, or any combination thereof.

The control circuit 11 is a circuit that controls the entire memory controller 10. The control circuit 11 includes, for example, a processor such as a central processing unit (CPU), a read only memory (ROM), and a random access memory (RAM).

The host interface circuit 12 manages communication between the memory controller 10 and the host 2. The host interface circuit 12 is connected to the host 2 via a host bus. The host bus conforms to, for example, Non-Volatile Memory Express (NVMe™).

The volatile memory interface circuit 13 manages communication between the memory controller 10 and the volatile memory 30. A bus MB that connects the volatile memory 30 and the memory controller 10 conforms to, for example, a DRAM interface standard.

The non-volatile memory interface circuit 14 manages communication between the memory controller 10 and the non-volatile memory 20. The non-volatile memory interface circuit 14 is connected to the non-volatile memory 20 via a memory bus. The memory bus conforms to, for example, a single data rate (SDR) interface, a toggle double data rate (DDR) interface, or an open NAND flash interface (ONFI).

1.3.2 Functional Configuration

Next, a functional configuration of the memory controller 10 will be described.

FIG. 4 is a block diagram illustrating an example of the functional configuration of the memory controller according to the embodiment. As illustrated in FIG. 4, the memory controller 10 functions as an NST management unit 15, a VCC management unit 16, a TB management unit 17, an LUT management unit 18, and a command response unit 19.

The NST management unit 15 associates a logical address designated by the host 2 with the logical address space of the memory system 3. Specifically, the NST management unit 15 allocates and releases the logical address space of the memory system 3 to and from a namespace NS designated by an NS ID at the granularity of the namespace allocation unit NSAU. The NST management unit 15 generates the NST 31 in order to manage an allocation status of the logical address space of the memory system 3 at the granularity of the namespace allocation unit NSAU. The NST management unit 15 stores the generated NST 31 to the volatile memory 30.

FIG. 5 is a diagram illustrating an example of a data structure of the NST according to the embodiment. As illustrated in FIG. 5, the NST 31 includes a plurality of storage regions each including a set of an NS ID and an NSAU ID.

The NSAU ID is an identifier for identifying a namespace allocation unit NSAU. The range of a logical address designated by one NSAU ID is equal to the range of a logical address designated by one NSAU granularity upper address.

In the example illustrated in FIG. 5, in the logical address space of the memory system 3, the namespace allocation units NSAU0 and NSAU2 are allocated to a namespace NS0. In the logical address space of the memory system 3, the namespace allocation unit NSAU1 is allocated to a namespace NS1.

The VCC management unit 16 (see FIG. 4) manages valid cluster counts VCC at the granularity of the valid cluster count units VCCU. Each of the valid cluster counts VCC is the number of clusters CST (valid clusters CST) storing valid data. The VCC management unit 16 generates the VCC information 32 in order to manage the valid cluster counts VCC. The VCC management unit 16 stores the generated VCC information 32 to the volatile memory 30.

FIG. 6 is a diagram illustrating an example of a relationship between the logical address space of the memory system according to the embodiment and each data structure of the VCC information, the TB information, and the LUT.

As illustrated in FIG. 6, the VCC information 32 includes a plurality of storage regions associated with the respective valid cluster count units VCCU. The valid cluster counts VCC are stored in the respective storage regions.

In the example illustrated in FIG. 6, "1" is stored as the valid cluster count VCC associated with the valid cluster count unit VCCU0 in the namespace allocation unit NSAU0. That is, it can be grasped that one cluster CST storing valid data is present in the valid cluster count unit VCCU0 in the namespace allocation unit NSAU0. In addition, "2" is stored as the valid cluster count VCC associated with the valid cluster count unit VCCU1 in the namespace allocation unit NSAU0. That is, it can be grasped that two clusters CST storing valid data are present in the valid cluster count unit VCCU1 in the namespace allocation unit NSAU0.

The TB management unit 17 (see FIG. 4) manages trim bits at the granularity of the segments SEG. Each of the trim bits is a bit indicating whether or not the memory system 3 is postponing the trim processing on the corresponding segment SEG. For example, in a case where the trim bit is "1", the trim bit indicates that the memory system 3 is postponing the trim processing on the corresponding segment SEG. In a case where the trim bit is "O", the trim bit indicates that the memory system 3 is not postponing the trim processing on the corresponding segment SEG. The TB management unit 17 generates the TB information 33 in order to manage the trim bits. The TB management unit 17 stores the generated TB information 33 to the volatile memory 30.

As illustrated in FIG. 6, the TB information 33 includes a plurality of storage regions associated with the respective segments SEG. A trim bit is stored in each of the storage regions.

In the example illustrated in FIG. 6, "0" and "1" are stored as trim bits associated with the segments SEG0 and SEG1 in the valid cluster count unit VCCU0 in the namespace allocation unit NSAU0, respectively. In addition, "0" and "O" are stored as trim bits associated with the segments SEG0 and SEG1 in the valid cluster count unit VCCU1 in the namespace allocation unit NSAU0, respectively. That is, it can be grasped that the memory system 3 postpones the trim processing on the segment SEG1 in the valid cluster count unit VCCU0 in the namespace allocation unit NSAU0.

The LUT management unit 18 (see FIG. 4) associates the logical address space with a physical address space in the memory system 3. Specifically, the LUT management unit 18 associates an address (physical address) of a physical region in which data is stored with a logical address of the data. The LUT management unit 18 generates the LUT 34 in order to manage a set of a logical address and a physical address that are associated with the same data. The LUT management unit 18 stores the generated LUT 34 to the volatile memory 30.

As illustrated in FIG. 6, the LUT 34 includes a plurality of storage regions (LUT entries) associated with the respective clusters CST. A physical address PA is stored in each of the LUT entries.

By using the LUT 34, mapping between each logical address and each physical address PA is managed. The memory controller 10 manages mapping between each logical address and each physical address PA in a specific management size unit using the LUT 34. In this case, the specific management size unit is the cluster CST. A physical address PA associated with a certain logical address indicates a physical storage location that is in the non-volatile memory 20 and at which data at the certain logical address is written. The memory controller 10 manages a plurality of storage regions obtained by logically dividing the storage region of the non-volatile memory 20 using the LUT 34. The size of each of the plurality of storage regions is the cluster CST. The plurality of storage regions are associated with a plurality of logical addresses. That is, each of the plurality of storage regions is specified by one logical address. The LUT 34 may be loaded from the non-volatile memory 20 to the volatile memory 30 when the memory system 3 is activated.

The memory controller 10 writes updated data associated with a certain logical address not to a physical storage location where previous data associated with the logical address is stored but to another physical storage location. Then, the memory controller 10 invalidates the previous data by updating an LUT entry so as to associate the logical address with the other physical storage location. Data (that is, data associated with a logical address) referred from the LUT 34 is valid data. In addition, data not associated with any logical address is invalid data. The valid data is data that may be read from the host 2 later. The invalid data is data that can no longer be read from the host 2.

In the example illustrated in FIG. 6, data designated by the logical address of the cluster CST0 in the segment SEG0 in the valid cluster count unit VCCU0 in the namespace allocation unit NSAU0 is stored in a physical region designated by a physical address PA0. Data designated by the logical address of the cluster CST0 in the segment SEG1 in the valid cluster count unit VCCU0 in the namespace allocation unit NSAU0 is stored in a physical region designated by a physical address PA1. Data designated by the logical address of the cluster CST0 in the segment SEG0 in the valid cluster count unit VCCU1 in the namespace allocation unit NSAU0 is stored in a physical region designated by a physical address PA2. Data designated by the logical address of the cluster CST0 in the segment SEG1 in the valid cluster count unit VCCU1 in the namespace allocation unit NSAU0 is stored in a physical region designated by a physical address PA3.

Note that valid data is not necessarily stored at physical addresses PA stored in the LUT 34. For example, in the example illustrated in FIG. 6, the trim bit associated with the segment SEG1 in the valid cluster count unit VCCU0 in the namespace allocation unit NSAU0 is "1". Therefore, the data stored in the physical region designated by the physical address PA1 is data scheduled to be subjected to the trim processing, and is data (that is, invalid data) for which an invalidation instruction is already given by the host 2. Therefore, the cluster CST0 in the segment SEG1 associated with an LUT entry storing the physical address PA1 is not counted as the valid cluster count VCC.

On the other hand, the trim bit associated with the segment SEG0 in the valid cluster count unit VCCU0 in the namespace allocation unit NSAU0 is "0". Therefore, the data stored in the physical region designated by the physical address PA0 is valid data not scheduled to be subjected to the trim processing. Therefore, the cluster CST0 in the segment SEG0 associated with the LUT entry stored in the physical region designated by the physical address PA0 is counted as the valid cluster count VCC.

The command response unit 19 (see FIG. 4) returns, to the host 2, a completion response to various commands from the host 2. The response to the host 2 conforms to the Open Compute Project (OCP). The response includes a value obtained by aggregating a sum of the valid cluster counts VCC for each namespace NS. The sum of the valid cluster counts VCC is also called a namespace utilization (NUSE). For example, the NUSE is included in a response corresponding to an NUSE information acquisition command from the host 2.

2. Operation

Next, an operation of the information processing system according to the embodiment will be described.

2.1 Series of Processing from Receiving Trim Command to Responding to Host

First, a series of processing from receiving a trim command to responding to the host in the memory system according to the embodiment will be described.

2.1.1 Overall Processing

Figure 7:
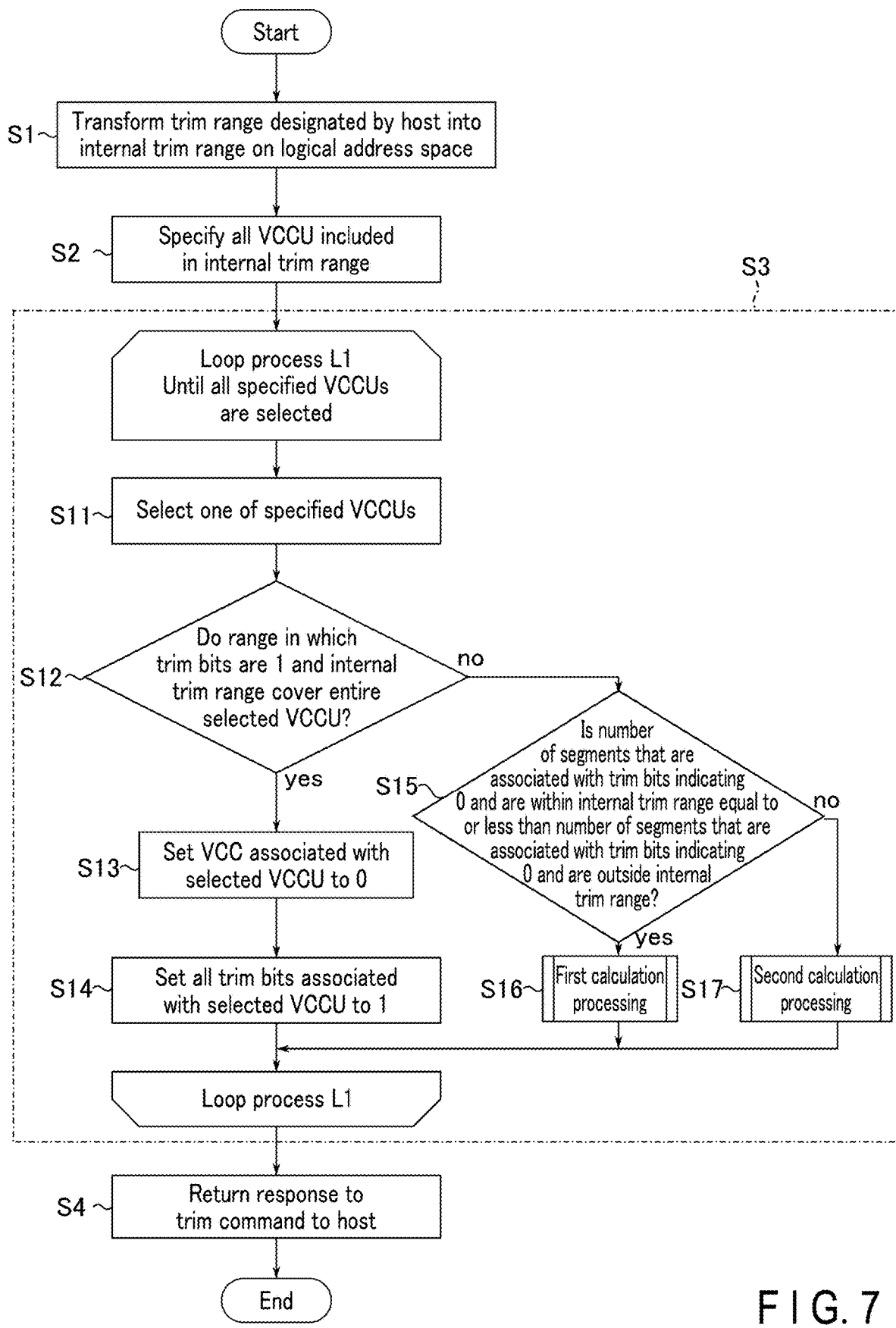
FIG. 7 is a flowchart illustrating an example of a series of processing from receiving a trim command to responding to the host in the memory system according to the embodiment.

FIG. 7 is a flowchart illustrating an example of a series of processing from receiving the trim command to responding to the host in the memory system according to the embodiment.

Upon receiving the trim command from the host 2 (start), the control circuit 11 transforms a trim range designated by the host 2 into an internal trim range on the logical address space of the memory system 3 (S1).

The control circuit 11 specifies all valid cluster count units VCCU included in the internal trim range (S2). In this case, in a case where at least a part of a valid cluster count unit VCCU is included in the internal trim range, the control circuit 11 determines that the valid cluster count unit VCCU is included in the internal trim range.

After the processing in S2, the control circuit 11 executes a loop process L1 (S3). The loop process L1 includes the following processing in S11 to S17.

In the loop process L1, the control circuit 11 selects one of the valid cluster count units VCCU specified in the processing in S2 (S11). In the loop process L1, the valid cluster count unit VCCU selected in the process in S11 is referred to as a selected unit VCCU.

The control circuit 11 refers to the TB information 33 and determines whether or not the internal trim range designated this time and a range in which trim bits are "1" (see S14) cover the entire selected unit VCCU (S12).

In a case where the internal trim range and the range in which the trim bits are "1" cover the entire selected unit VCCU (S12; yes), the control circuit 11 edits the VCC information 32 and sets the valid cluster count VCC associated with the selected unit VCCU to "0" (S13).

After the processing in S13, the control circuit 11 sets all the plurality of trim bits associated with all the segments SEG in the selected unit VCCU to "1" (S14).

In a case where the internal trim range and the range in which the trim bits are "1" do not cover the entire selected unit VCCU (S12; no), the control circuit 11 determines whether or not the number of segments SEG that are associated with trim bits indicating "0" and are within the internal trim range in the selected unit VCCU is less than or equal to the number of segments SEG that are associated with trim bits indicating "0" and are outside the internal trim range (S15).

In the selected unit VCCU, in a case where the number of segments SEG that are associated with trim bits indicating "0" and are within the internal trim range is less than or equal to the number of segments SEG that are associated with trim bits indicating "0" and are outside the internal trim range (S15; yes), the control circuit 11 executes the first calculation processing in order to newly calculate the value of the VCC (S16). That is, the first calculation processing is processing performed focusing on a segment SEG that is associated with a trim bit indicating "0" and is within the internal trim range. In the first calculation processing, the valid cluster count VCC in consideration of the trim command is calculated from the current value by a subtraction method. Details of the first calculation processing will be described later.

Furthermore, in a case where only a part of a segment SEG that is associated with a trim bit indicating "0" and is in the selected unit VCCU is included in the internal trim range, the segment SEG is not included in the "number of segments SEG that are associated with trim bits indicating "0" and are outside the internal trim range". Similarly, the segment SEG is not included in the "number of segments SEG that are associated with trim bits indicating "0" and are within the internal trim range".

In the selected unit VCCU, in a case where the number of segments SEG that are associated with trim bits indicating "0" and are within the internal trim range is greater than the number of segments SEG that are associated with trim bits indicating "0" and are outside the internal trim range (S15; no), the control circuit 11 executes second calculation processing in order to newly calculate the value of the VCC (S17). That is, the second calculation processing is processing performed focusing on a segment SEG that is associated with a trim bit indicating "0" and is outside the internal trim range. In the second calculation processing, the valid cluster count VCC in consideration of the trim command is calculated from 0 by an addition method. Details of the second calculation processing will be described later.

After the processing in S14, S16, or S17, the control circuit 11 determines whether or not all the valid cluster count units VCCU specified in the processing in S2 have been selected. In a case where an unselected valid cluster count unit VCCU is present, the control circuit 11 repeats the processing in S11 to S17 described above. After all the valid cluster count units VCCU specified in the processing in S2 are selected, the control circuit 11 ends the loop process L1.

After the loop process L1, the control circuit 11 returns a response corresponding to the trim command to the host 2 (S4).

When the processing in S4 ends, the series of processing from receiving the trim command to responding to the host 2 ends (end).

2.1.2 First Calculation Processing

Figure 8:
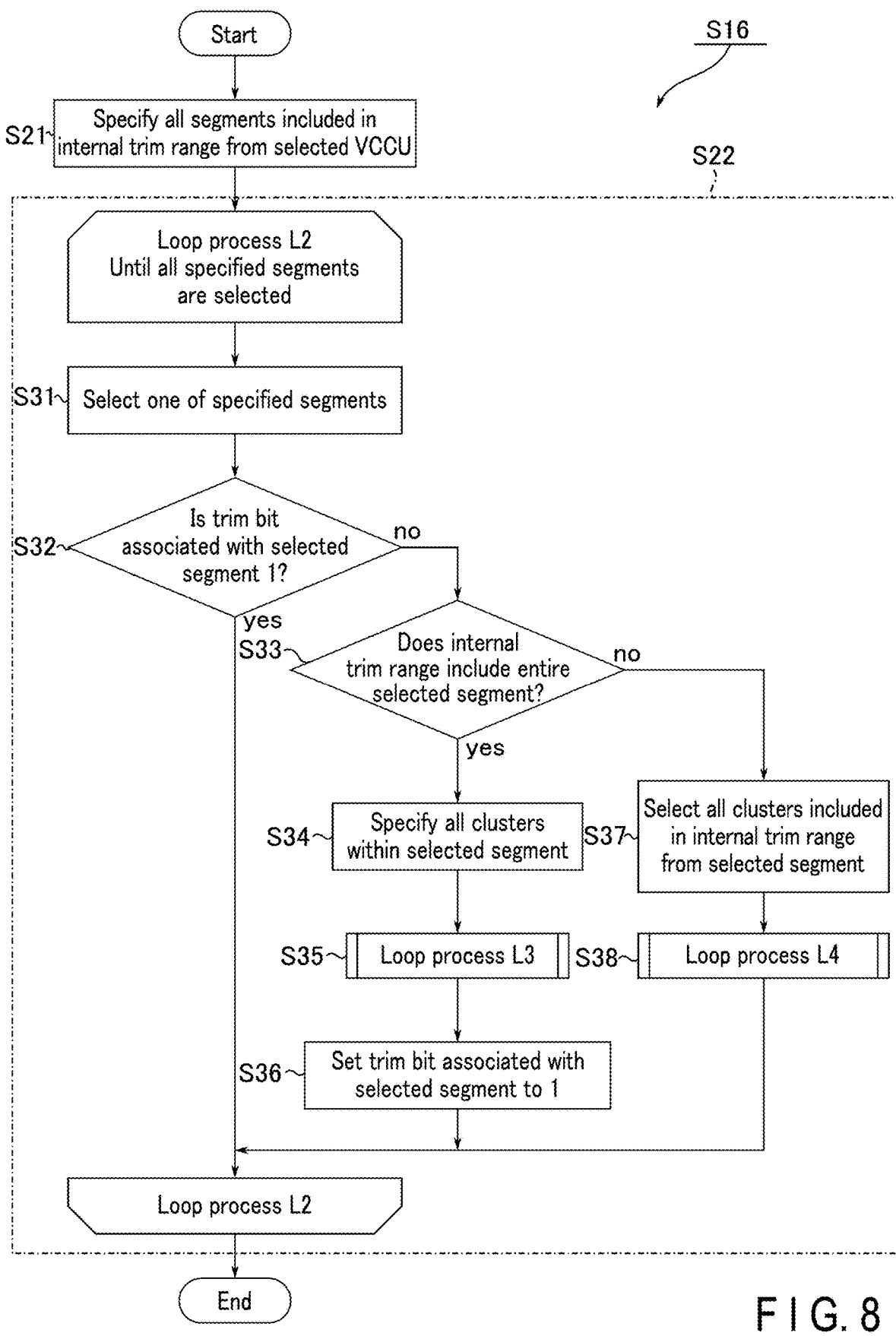
FIG. 8 is a flowchart illustrating an example of first calculation processing of calculating a valid cluster count in the memory system according to the embodiment.

FIG. 8 is a flowchart illustrating an example of the first calculation processing in the memory system according to the embodiment. Processing in S21 and S22 illustrated in FIG. 8 corresponds to the first calculation processing in S16 in FIG. 7.

When the first calculation processing is started (start), the control circuit 11 specifies all the segments SEG included in the internal trim range from the selected unit VCCU (S21). In a case where at least a part of a segment SEG is included in the internal trim range, the control circuit 11 determines that the segment SEG is included in the internal trim range.

After the processing in S21, the control circuit 11 executes a loop process L2 (S22). The loop process L2 includes the following processing in S31 to S38.

In the loop process L2, the control circuit 11 selects one of the segments SEG specified in the processing in S21 (S31). In the loop process L2, the segment SEG selected in the processing in S31 is referred to as a selected segment SEG.

The control circuit 11 refers to the TB information 33 and determines whether or not the trim bit associated with the selected segment SEG is "1" (S32).

In a case where the trim bit associated with the selected segment SEG is "0" (S32; no), the control circuit 11 determines whether or not the internal trim range includes the entire selected segment SEG (S33).

In a case where the internal trim range includes the entire selected segment SEG (S33; yes), the control circuit 11 specifies all the clusters CST within the selected segment SEG (S34).

Figure 9:
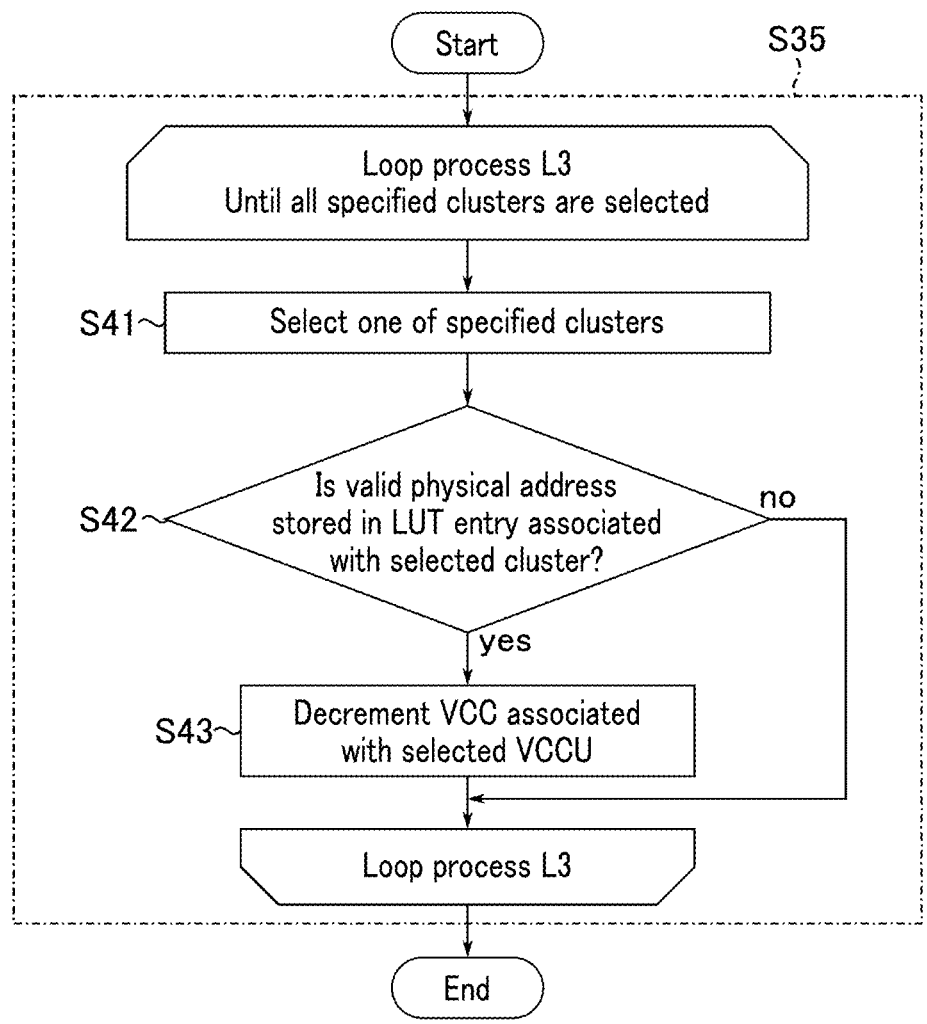
FIG. 9 is a flowchart illustrating a first example of a loop process in the first calculation processing of calculating a valid cluster count in the memory system according to the embodiment.

After the processing in S34, the control circuit 11 executes a loop process L3 (S35). FIG. 9 is a flowchart illustrating a first example of the loop process in the first calculation processing in the memory system according to the embodiment. Processing in S41 to S43 illustrated in FIG. 9 corresponds to the loop process L3 in S35 in FIG. 8.

As illustrated in FIG. 9, in the loop process L3, the control circuit 11 selects one of the clusters CST specified in the processing in S34 (S41). In the loop process L3, the cluster CST selected in the processing in S41 is referred to as a selected cluster CST.

The control circuit 11 refers to the LUT 34 and determines whether or not a valid physical address PA is stored in the LUT entry associated with the selected cluster CST (S42).

In a case where the valid physical address PA is stored in the LUT entry associated with the selected cluster CST (S42; yes), the control circuit 11 edits the VCC information 32 and decrements the valid cluster count VCC associated with the selected unit VCCU (S43).

In a case where the valid physical address PA is not stored in the LUT entry associated with the selected cluster CST (S42; no) or after the processing in S43, the control circuit 11 determines whether or not all the clusters CST specified in the processing in S34 have been selected. In a case where an unselected cluster CST is present, the control circuit 11 repeats the processing in S41 to S43 described above. After all the clusters CST specified in the processing in S34 are selected, the control circuit 11 ends the loop process L3 (end).

The first calculation processing will be described again with reference to FIG. 8.

After the loop process L3 in S35, the control circuit 11 edits the TB information 33 and sets the trim bit associated with the selected segment SEG to "1" (S36).

In a case where the internal trim range does not include the entire selected segment SEG (S33; no), the control circuit 11 specifies all the clusters CST included in the internal trim range from the selected segment SEG (S37).

Figure 10:
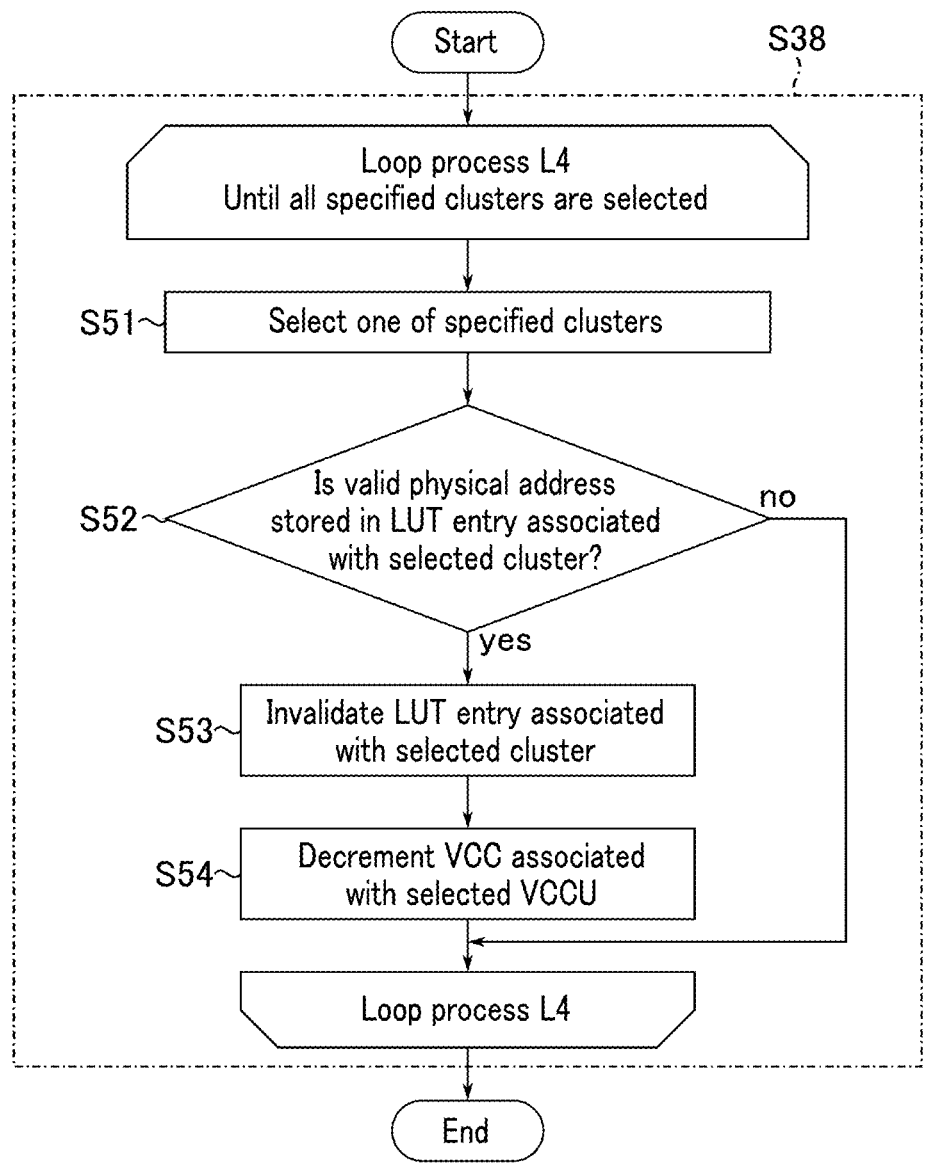
FIG. 10 is a flowchart illustrating a second example of a loop process in the first calculation processing of calculating a valid cluster count in the memory system according to the embodiment.

After the processing in S37, the control circuit 11 executes a loop process L4 (S38). FIG. 10 is a flowchart illustrating a second example of the loop process in the first calculation processing in the memory system according to the embodiment. Processing in S51 to S54 illustrated in FIG. 10 corresponds to the loop process L4 in S38 in FIG. 8.

As illustrated in FIG. 10, in the loop process L4, the control circuit 11 selects one of the clusters CST specified in the processing in S37 (S51). In the loop process L4, the cluster CST selected in the processing in S51 is referred to as a selected cluster CST.

The control circuit 11 refers to the LUT 34 and determines whether or not a valid physical address PA is stored in the LUT entry associated with the selected cluster CST (S52).

In a case where the valid physical address PA is stored in the LUT entry associated with the selected cluster CST (S52; yes), the control circuit 11 edits the LUT 34 and invalidates the LUT entry associated with the selected cluster CST (S53).

After the processing in S53, the control circuit 11 edits the VCC information 32 and decrements the valid cluster count VCC associated with the selected unit VCCU (S54).

In a case where the valid physical address PA is not stored in the LUT entry associated with the selected cluster CST (S52; no) or after the processing in S54, the control circuit 11 determines whether or not all the clusters CST specified in the processing in S37 have been selected. In a case where an unselected cluster CST is present, the control circuit 11 repeats the processing in S51 to S54 described above. After all the clusters CST specified in the processing in S37 are selected, the control circuit 11 ends the loop process L4 (end).

The first calculation processing will be described again with reference to FIG. 8.

In a case where the trim bit associated with the selected segment SEG is "1" (S32; yes), after the processing in S36 following the loop process L3 in S35, or after the loop process L4 in S38, the control circuit 11 determines whether or not all the segments SEG specified in the processing in S21 have been selected. In a case where an unselected segment SEG is present, the control circuit 11 repeats the processing in S31 to S38 described above. After all the segments SEG specified in the processing in S21 are selected, the control circuit 11 ends the loop process L2.

When the loop process L2 ends, the first calculation processing ends (end).

2.1.3 Second Calculation Processing

Figure 11:
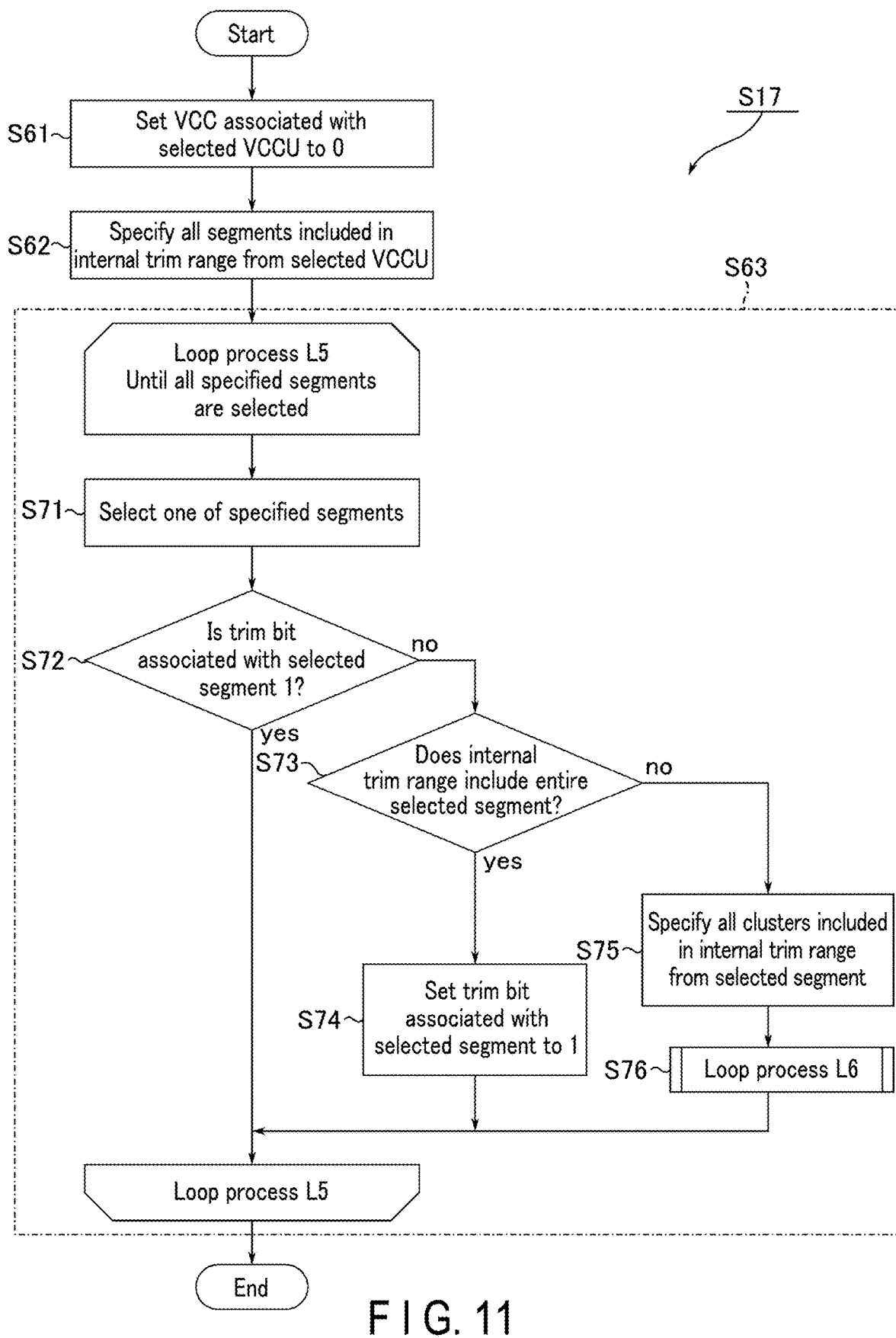
FIG. 11 is a flowchart illustrating an example of second calculation processing of calculating a valid cluster count in the memory system according to the embodiment.

FIG. 11 is a flowchart illustrating an example of the second calculation processing in the memory system according to the embodiment. Processing in S61 to S63 illustrated in FIG. 11 corresponds to the second calculation processing in S17 in FIG. 7.

After the second calculation processing is started (start), the control circuit 11 edits the VCC information 32 and sets the valid cluster count VCC associated with the selected unit VCCU to "0" (S61).

After the processing in S61, the control circuit 11 specifies all the segments SEG included in the internal trim range from the selected unit VCCU (S62).

After the processing in S62, the control circuit 11 executes a loop process L5 (S63). The loop process L5 includes the following processing in S71 to S76.

In the loop process L5, the control circuit 11 selects one of the segments SEG specified in the processing in S62 (S71). In the loop process L5, the segment SEG selected in the processing in S71 is referred to as a selected segment SEG.

The control circuit 11 refers to the TB information 33 and determines whether or not the trim bit associated with the selected segment SEG is "1" (S72).

In a case where the trim bit associated with the selected segment SEG is "0" (S72; no), the control circuit 11 determines whether or not the internal trim range includes the entire selected segment SEG (S73).

In a case where the internal trim range includes the entire selected segment SEG (S73; yes), the control circuit 11 edits the TB information 33 and sets the trim bit associated with the selected segment SEG to "1" (S74).

In a case where the internal trim range does not include the entire selected segment SEG (S73; no), the control circuit 11 specifies all the clusters CST included in the internal trim range from the selected segment SEG (S75).

Figure 12:
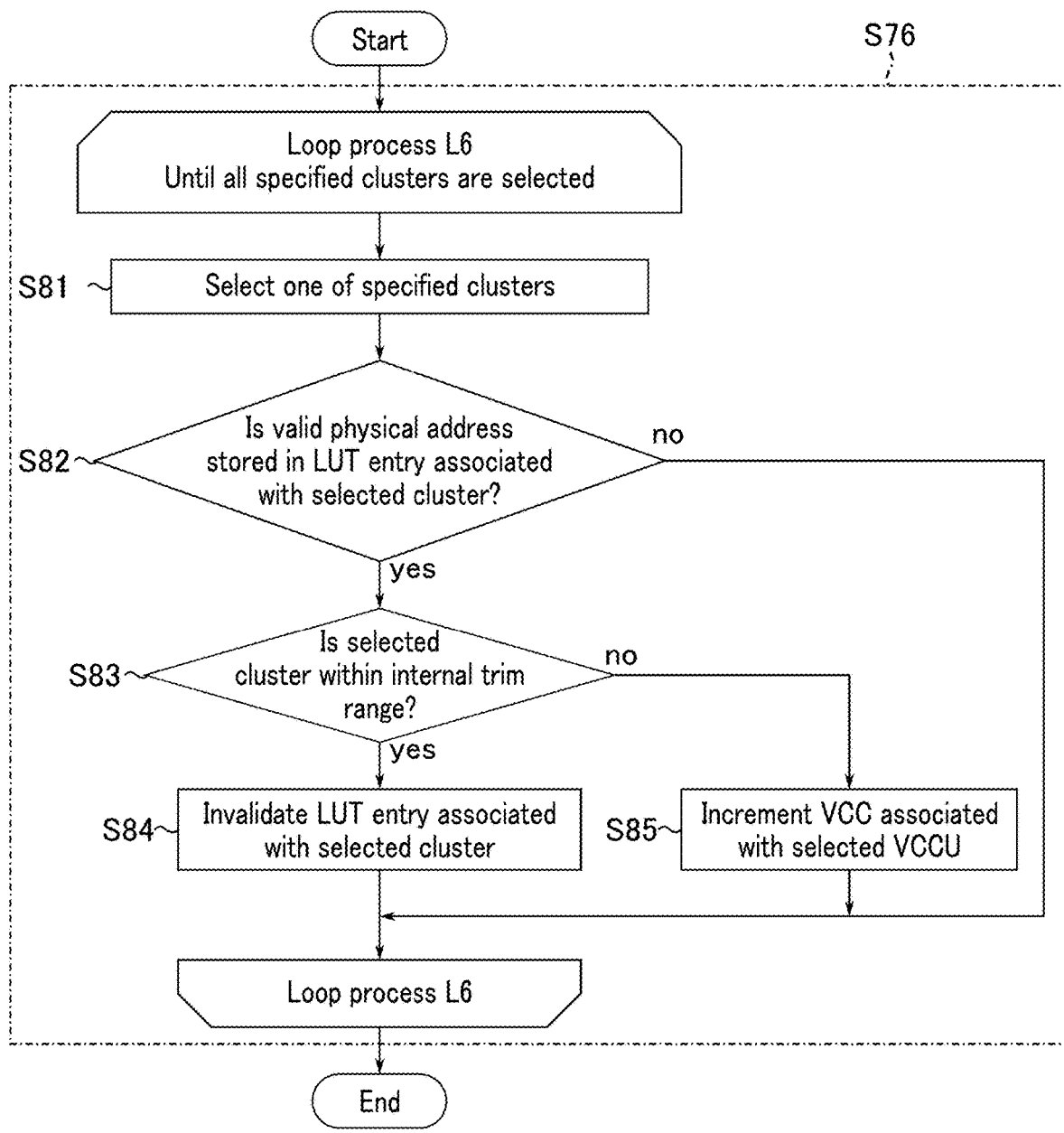
FIG. 12 is a flowchart illustrating an example of a loop process in the second calculation processing of calculating a valid cluster count in the memory system according to the embodiment.

After the processing in S75, the control circuit 11 executes a loop process L6 (S76). FIG. 12 is a flowchart illustrating an example of the loop process in the second calculation processing in the memory system according to the embodiment. Processing in S81 to S85 illustrated in FIG. 12 corresponds to the loop process L6 in S76 in FIG. 11.

As illustrated in FIG. 12, in the loop process L6, the control circuit 11 selects one of the clusters CST specified in the processing in S75 (S81). In the loop process L6, the cluster CST selected in the processing in S81 is referred to as a selected cluster CST.

The control circuit 11 refers to the LUT 34 and determines whether or not a valid physical address PA is stored in the LUT entry associated with the selected cluster CST (S82).

In a case where the valid physical address PA is stored in the LUT entry associated with the selected cluster CST (S82; yes), the control circuit 11 determines whether or not the selected cluster CST is within the internal trim range (S83).

In a case where the selected cluster CST is within the internal trim range (S83; yes), the control circuit 11 edits the LUT 34 and invalidates the LUT entry associated with the selected cluster CST (S84).

In a case where the selected cluster CST is not within the internal trim range (S83; no), the control circuit 11 edits the VCC information 32 and increments the valid cluster count VCC associated with the selected unit VCCU (S85).

In a case where the valid physical address PA is not stored in the LUT entry associated with the selected cluster CST (S82; no), after the processing in S84 or after the processing in S85, the control circuit 11 determines whether or not all the clusters CST specified in the processing in S75 have been selected. In a case where an unselected cluster CST is present, the control circuit 11 repeats the processing in S81 to S85 described above. After all the clusters CST specified in the processing in S75 are selected, the control circuit 11 ends the loop process L6 (end).

The second calculation processing will be described again with reference to FIG. 11.

In a case where the trim bit associated with the selected segment SEG is "1" (S72; yes), after the processing in S74 or after the loop process L6 in S76, the control circuit 11 determines whether or not all the segments SEG specified in the processing in S62 have been selected. In a case where an unselected segment SEG is present, the control circuit 11 repeats the processing in S71 to S76 described above. After all the segments SEG specified in the processing in S62 are selected, the control circuit 11 ends the loop process L5.

When the loop process L5 ends, the second calculation processing ends (end).

2.2 Trim Processing

Next, the trim processing in the memory system according to the embodiment will be described.

The memory system 3 can start the trim processing at any timing regardless of the timing of receiving a trim command. The memory system 3 executes the trim processing in a period in which processing in which the response time to the host 2 is restricted is not being executed (for example, a period in which data is being written to the non-volatile memory 20), that is, in the background. For example, before the write processing, the memory system 3 executes the trim processing in order to reuse a physical region storing invalid data.

FIG. 13 is a flowchart illustrating an example of the trim processing in the memory system according to the embodiment.

When the trim processing is started (start), the control circuit 11 refers to the TB information 33 and determines whether or not a segment SEG associated with a trim bit indicating "1" is present (S91).

In a case where the segment SEG associated with the trim bit indicating "1" is present (S91; yes), the control circuit 11 selects the one segment SEG associated with the trim bit indicating "1" (S92). In the trim processing, the segment selected in the processing in S92 is referred to as a selected segment SEG.

Although which segment SEG is freely selected, the control circuit 11 may determine a segment SEG to be selected based on a predetermined determination criterion. For example, the control circuit 11 may preferentially select a segment SEG associated with a trim bit whose value has been "1" for a long period of time. Furthermore, for example, the control circuit 11 may preferentially select a segment SEG within the range of the write processing.

After the processing in S92, the control circuit 11 executes reset processing (to be described in detail later) of resetting the trim bit associated with the segment SEG selected in the processing in S92 (S93).

After the reset processing of resetting the trim bit in S93, the trim processing ends (end).

Figure 14:
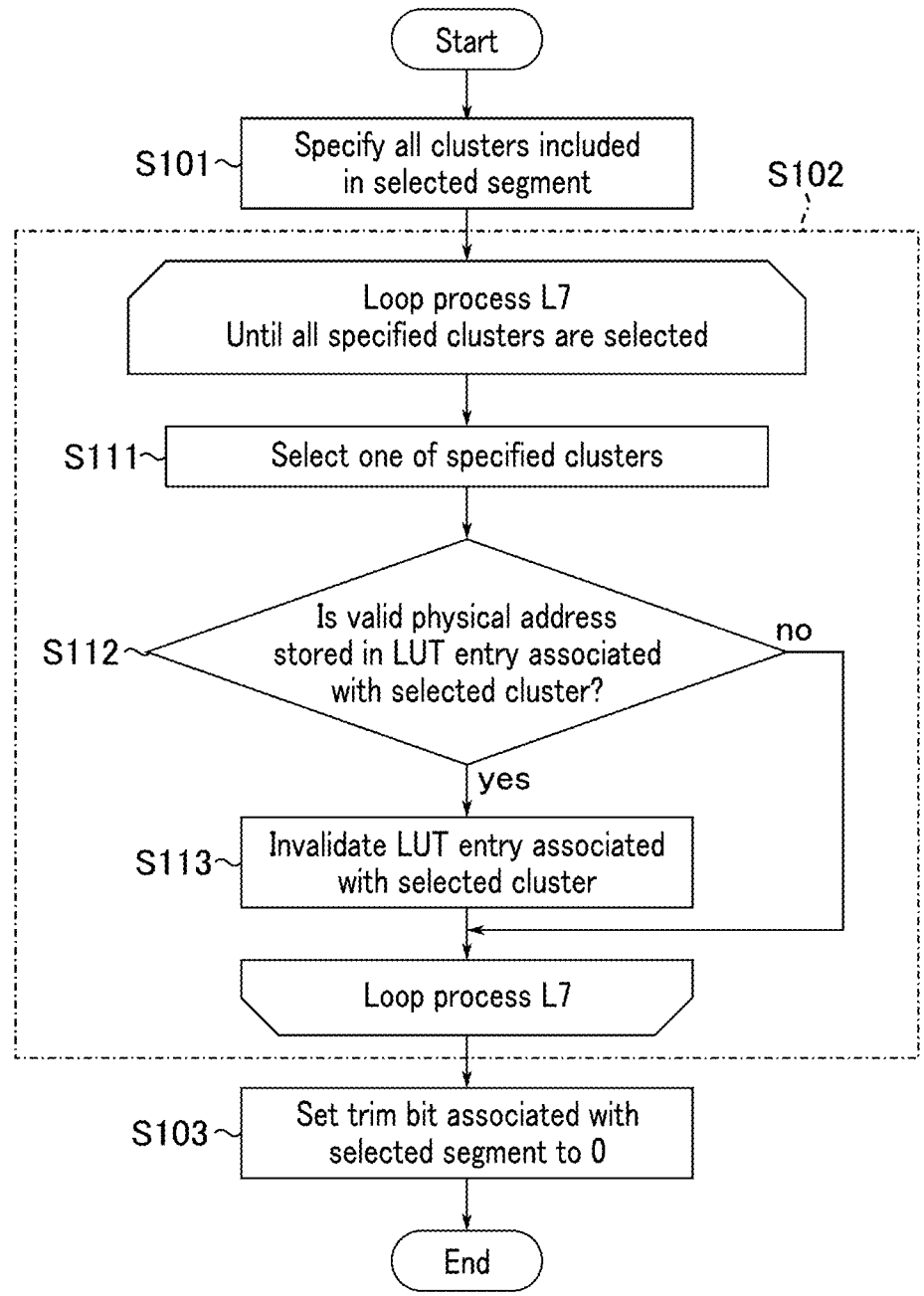
FIG. 14 is a flowchart illustrating an example of reset processing of resetting a trim bit in the memory system according to the embodiment.

FIG. 14 is a flowchart illustrating an example of the reset processing of resetting the trim bit in the memory system according to the embodiment. Processing in S101 to S103 illustrated in FIG. 14 corresponds to, for example, the reset processing of resetting the trim bit in S93 in FIG. 13.

When the reset processing of resetting the trim bit is started (start), the control circuit 11 specifies all the clusters CST included in the selected segment SEG (S101).

After the processing in S101, the control circuit 11 executes a loop process L7 (S102). The loop process L7 includes the following processing in S111 to S113.

In the loop process L7, the control circuit 11 selects one of the clusters CST specified in the processing in S101 (S111). In the loop process L7, the cluster CST selected in the processing in S111 is referred to as a selected cluster CST.

The control circuit 11 refers to the LUT 34 and determines whether or not a valid physical address PA is stored in the LUT entry associated with the selected cluster CST (S112).

In a case where the valid physical address PA is stored in the LUT entry associated with the selected cluster CST (S112; yes), the control circuit 11 edits the LUT 34 and invalidates the LUT entry associated with the selected cluster CST (S113).

In a case where the valid physical address PA is not stored in the LUT entry associated with the selected cluster CST (S112; no) or after the processing in S113, the control circuit 11 determines whether or not all the clusters CST specified in the processing in S101 have been selected. In a case where an unselected cluster CST is present, the control circuit 11 repeats the processing in S111 to S113 described above. After all the clusters CST specified in the processing in S101 are selected, the control circuit 11 ends the loop process L7.

After the loop process L7 in S102, the control circuit 11 sets the trim bit associated with the selected segment to "0" (S103).

When the processing in S103 ends, the reset processing of resetting the trim bit ends (end).

2.3 Series of Processing from Receiving Write Command to Responding to Host

Next, a series of processing from receiving a write command to responding to the host in the memory system according to the embodiment will be described.

2.3.1 Overall Processing

Figure 15:
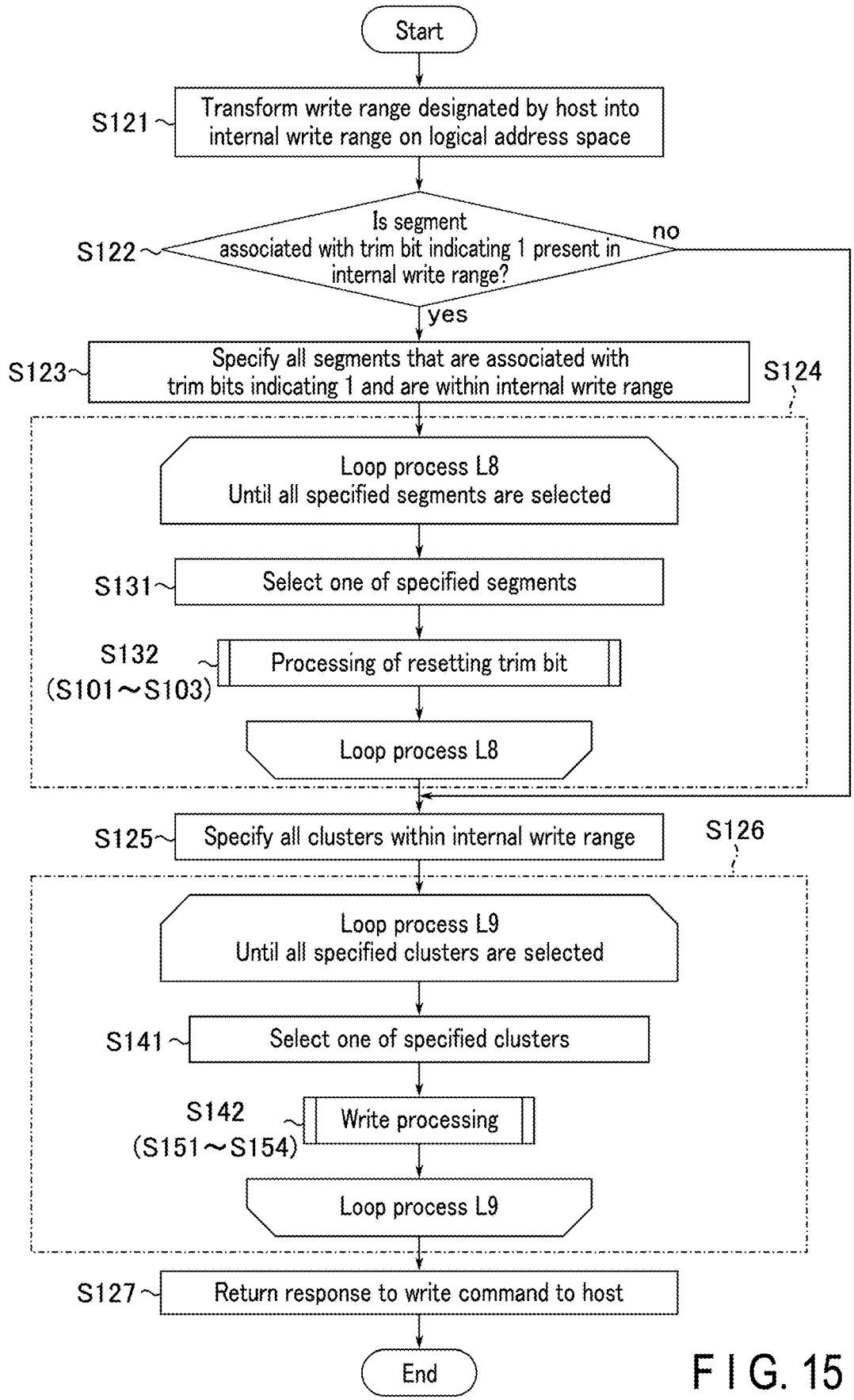
FIG. 15 is a flowchart illustrating an example of a series of processing from receiving a write command to responding to the host in the memory system according to the embodiment.

FIG. 15 is a flowchart illustrating an example of a series of processing from receiving a write command to responding to the host in the memory system according to the embodiment.

Upon receiving the write command from the host 2 (start), the control circuit 11 transforms a write range designated by the host 2 into an internal write range on the logical address space of the memory system 3 (S121).

The control circuit 11 determines whether or not a segment SEG associated with a trim bit indicating "1" is present in the internal write range (S122).

In a case where the segment SEG associated with the trim bit indicating "1" is present in the internal write range (S122; yes), the control circuit 11 specifies all the segments SEG that are associated with trim bits indicating "1" and are within the internal write range (S123).

After the processing in S123, the control circuit 11 executes a loop process L8 (S124). The loop process L8 includes the following processing in S131 and S132.

In the loop process L8, the control circuit 11 selects one of the segments SEG specified in the processing in S123 (S131). In the loop process L8, the segment SEG selected in the processing in S131 is referred to as a selected segment SEG.

After the processing in S131, the control circuit 11 executes reset processing of resetting the trim bit (S132). The reset processing of resetting the trim bit in S132 is equivalent to the processing in S101 to S103 described in FIG. 14.

After the reset processing of resetting the trim bit in S132, the control circuit 11 determines whether or not all the segments SEG specified in the processing in S123 have been selected. In a case where an unselected segment SEG is present, the control circuit 11 repeats the processing in S131 and S132 described above. After all the segments SEG specified in the processing in S123 are selected, the control circuit 11 ends the loop process L8.

In a case where the segment SEG associated with the trim bit indicating "1" is not present in the internal write range (S122; no), or after the loop process L8 in S124, the control circuit 11 specifies all the clusters CST within the internal write range (S125).

After the processing in S125, the control circuit 11 executes a loop process L9 (S126). The loop process L9 includes the following processing in S141 and S142.

In the loop process L9, the control circuit 11 selects one of the clusters CST specified in the processing in S125 (S141). In the loop process L9, the cluster CST selected in the processing in S141 is referred to as a selected cluster CST.

After the processing in S141, the control circuit 11 executes write processing (S142). FIG. 16 is a flowchart illustrating an example of the write processing in the memory system according to the embodiment. Processing in S151 to S154 illustrated in FIG. 16 corresponds to the write processing in S142 in FIG. 15.

As illustrated in FIG. 16, in the write processing (start), the control circuit 11 refers to the LUT 34 and determines whether or not a valid physical address PA is stored in the LUT entry associated with the selected cluster CST (S151).

In a case where the valid physical address PA is not stored in the LUT entry associated with the selected cluster CST (S151; no), the control circuit 11 edits the VCC information 32 and increments the valid cluster count VCC associated with the valid cluster count unit VCCU to which the selected cluster CST belongs (S152).

In a case where the valid physical address PA is stored in the LUT entry associated with the selected cluster CST (S151; yes) or after the processing in S152, the control circuit 11 writes valid data to the non-volatile memory 20 (S153).

In addition, the control circuit 11 edits the LUT 34 and stores the physical address of the valid data to the LUT entry associated with the selected cluster CST (S154).

When the processing in S154 ends, the write processing ends (end).

The series of processing from receiving the write command to responding to the host will be described again with reference to FIG. 15.

After the write processing in S142, the control circuit 11 determines whether or not all the clusters CST specified in the processing in S125 have been selected. In a case where an unselected cluster CST is present, the control circuit 11 repeats the processing in S141 and S142 described above. After all the clusters CST specified in the processing in S125 are selected, the control circuit 11 ends the loop process L9.

After the loop process L9 in S126, the control circuit 11 returns a response to the write command to the host 2 (S127).

When the processing in S127 ends, the series of processing from receiving the write command to responding to the host ends (end).

2.4 Series of Processing from Receiving NUSE Information Acquisition Command to Responding to Host Next, a series of processing from receiving an NUSE information acquisition command to responding to the host in the memory system according to the embodiment will be described.

2.4.1 Overall Processing

FIG. 17 is a flowchart illustrating an example of a series of processing from receiving the NUSE information acquisition command to responding to the host in the memory system according to the embodiment.

Upon receiving the NUSE information acquisition command from the host 2 (start), the control circuit 11 calculates, for each designated namespace NS, a total value of the values of the valid cluster counts VCC (S160). The calculated total value of the valid cluster counts VCC is, that is, an NUSE.

The control circuit 11 returns a response including the calculated value of the NUSE to the host 2 (S161).

When the processing in S161 ends, the series of processing from receiving the NUSE information acquisition command to responding to the host ends (end).

In this case, the method has been described in which the control circuit 11 calculates the NUSE by summing the values of the valid cluster counts VCC for each namespace NS after receiving the NUSE information acquisition command, but the NUSE may be calculated by another method. For example, an NUSE counter having an initial value of 0 at the time of generation of a namespace NS may be provided for each namespace NS. In this case, the control circuit 11 may calculate the NUSE by increasing or decreasing the NUSE counter each time the value of the valid cluster count VCC allocated to the namespace NS increases or decreases.

3. Specific Examples

Next, specific examples of a change in each of the valid cluster counts VCC in the memory system according to the embodiment will be described.

In the following specific examples, the states of the VCC information 32, the TB information 33, and the LUT 34 illustrated in FIG. 6 are set as initial states. For convenience of description, it is assumed that the namespace allocation unit NSAU0 is divided into two valid cluster count units VCCU0 and VCCU1. It is assumed that each of the valid cluster count units VCCU0 and VCCU1 is divided into two segments SEG0 and SEG1. It is assumed that each of the segments SEG0 and SEG1 is divided into two clusters CST0 and CST1.

3.1 First Case

First, a first case will be described. The first case is an example when the memory system 3 receives the trim command from the host 2, and corresponds to a case where it is determined that the range of the trim processing covers the selected unit VCCU (S12; yes). In the first case, it is assumed that the internal trim range is the valid cluster count unit VCCU0.

FIG. 18 is a diagram illustrating a specific example of the VCC information, the TB information, and the LUT in the first case in the memory system according to the embodiment.

As illustrated in FIG. 18, the control circuit 11 sets the valid cluster count VCC associated with the valid cluster count unit VCCU0 from "1" to "0" (S13). The processing in S13 is executed without examining the valid cluster count VCC at the granularity of the clusters CST. Therefore, the control circuit 11 can execute the processing in S13 at a higher speed than that in a case where the valid cluster count VCC is examined at the granularity of the clusters CST.

After the processing in S13, the control circuit 11 changes the trim bit associated with the segment SEG0 of the valid cluster count unit VCCU0 to "1" (S14).

Thereafter, the control circuit 11 returns a response to the trim command to the host 2 (S4).

The trim processing is executed after the response processing in S4. That is, the memory system 3 postpones the trim processing in order to execute the trim processing in the background.

3.2 Second Case

Next, a second case will be described. The second case is an example when the memory system 3 receives the trim command from the host 2, and corresponds to a case where it is determined that the range of the trim processing does not cover the selected unit VCCU (S12; no) and that the internal trim range includes the entire selected segment SEG (S33; yes). The second case corresponds to the first calculation processing (S16). In the second case, it is assumed that the internal trim range is the segment SEG0 of the valid cluster count unit VCCU1. That is, in the second case, the selected unit VCCU is the valid cluster count unit VCCU1, and the selected segment SEG is the segment SEG0 of the valid cluster count unit VCCU1.

FIG. 19 is a diagram illustrating a specific example of the VCC information, the TB information, and the LUT in the second case in the memory system according to the embodiment.

As illustrated in FIG. 19, in the loop process L3, the control circuit 11 decrements the valid cluster count VCC associated with the valid cluster count unit VCCU1 according to the number of LUT entries in which a valid physical address PA is stored (S35). That is, the control circuit 11 checks the presence or absence of the valid cluster in the selected segment SEG0 at the granularity of the clusters CST. In the second case, since the valid cluster CST in the selected segment SEG0 is the cluster CST0, the control circuit 11 changes the valid cluster count VCC from "2" to "1". As a result, the control circuit 11 can accurately grasp the valid cluster count VCC at the granularity of the clusters CST.

After the processing in S35, the control circuit 11 changes the trim bit associated with the segment SEG0 of the valid cluster count unit VCCU1 from "0" to "1" (S36).

Thereafter, the control circuit 11 returns a response to the trim command to the host 2 (S4).

The trim processing is executed after the response processing in S4. That is, the memory system 3 postpones the trim processing in order to execute the trim processing in the background.

3.3 Third Case

Next, a third case will be described. The third case is an example when the memory system 3 receives the trim command from the host 2, and corresponds to a case where it is determined that the range of the trim processing does not cover the selected unit VCCU (S12; no) and that the internal trim range does not include the entire selected segment SEG (S33; no). The third case corresponds to the first calculation processing (S16). In the third case, it is assumed that the internal trim range is the cluster CST0 of the segment SEG1 of the valid cluster count unit VCCU1. That is, in the third case, the selected unit VCCU is the valid cluster count unit VCCU1. The selected segment SEG is the segment SEG1 of the valid cluster count unit VCCU1. The selected cluster CST is the cluster CST0 of the segment SEG1 of the valid cluster count unit VCCU1.

FIG. 20 is a diagram illustrating a specific example of the VCC information, the TB information, and the LUT in the third case in the memory system according to the embodiment.

As illustrated in FIG. 20, the control circuit 11 invalidates the selected cluster CST0 in the loop process L4 (S53). That is, the control circuit 11 invalidates the physical address PA stored in the LUT entry associated with the selected cluster CST0 of the LUT 34.

After the processing in S53, the control circuit 11 decrements the valid cluster count VCC associated with the valid cluster count unit VCCU1 according to the number of invalidated LUT entries (S54). That is, the control circuit 11 checks the valid cluster count VCC associated with the valid cluster count unit VCCU1 at the granularity of the clusters CST. In the third case, since the valid cluster CST0 in the selected segment SEG0 is invalidated, the control circuit 11 changes the valid cluster count VCC from "2" to "1". As a result, the control circuit 11 can accurately grasp the valid cluster count VCC at the granularity of the clusters CST.

Thereafter, the control circuit 11 returns a response to the trim command to the host 2 (S4).

As described above, in a case where a range narrower than the segment SEG is the internal trim range, the trim processing is executed before the response processing in S4 without being postponed. Therefore, in the third case, the trim bit is not changed.

3.4 Fourth Case

Next, a fourth case will be described. The fourth case is an example of reset processing of resetting a trim bit in the background. In the fourth case, it is assumed that the target range of the reset processing of resetting the trim bit is the segment SEG1 of the valid cluster count unit VCCU0. That is, in the fourth case, the selected segment SEG is the segment SEG1 of the valid cluster count unit VCCU0. The selected cluster CST is the cluster CST0 of the segment SEG1 of the valid cluster count unit VCCU0.

FIG. 21 is a diagram illustrating a specific example of the VCC information, the TB information, and the LUT in the fourth case in the memory system according to the embodiment.

As illustrated in FIG. 21, in the loop process L7, the control circuit 11 invalidates the LUT entry associated with the selected cluster CST0 (S102).

After the loop process L7, the control circuit 11 changes the trim bit associated with the selected segment SEG1 from "1" to "0" (S103).

As described above, when the trim processing is executed in the background after the response processing in S4, the valid cluster count VCC is not changed.

3.5 Fifth Case

Next, a fifth case will be described. The fifth case is an example of the write processing. In the fifth case, it is assumed that the target range of the write processing is the cluster CST1 of the segment SEG1 of the valid cluster count unit VCCU0. That is, in the fifth case, the selected segment SEG is the segment SEG1 of the valid cluster count unit VCCU0.

FIG. 22 is a diagram illustrating a first specific example of the VCC information, the TB information, and the LUT in the fifth case in the memory system according to the embodiment. FIG. 23 is a diagram illustrating a second specific example of the VCC information, the TB information, and the LUT in the fifth case in the memory system according to the embodiment. The first specific example of the fifth case indicates changes in the VCC information 32, the TB information 33, and the LUT 34 based on reset processing of resetting a trim bit in the foreground prior to the write processing. The second specific example of the fifth case indicates changes in the VCC information 32, the TB information 33, and the LUT 34 based on the write processing.

As illustrated in FIG. 22, the control circuit 11 executes reset processing of resetting the trim bit for the selected segment SEG1 (S132).

Accordingly, in the loop process L7, the control circuit 11 invalidates the LUT entry associated with the cluster CST0 in the selected segment SEG1 (S102).

After the loop process L7, the control circuit 11 changes the trim bit associated with the selected segment SEG1 from "1" to "0" (S103).

As described above, the valid cluster count VCC is not changed when the reset processing of resetting the trim bit is executed.

Then, after the completion of the reset processing of resetting the trim bit, as illustrated in FIG. 23, the control circuit 11 executes the write processing (S142).

Before the write processing is executed, valid data is not stored in the cluster CST1 that is the internal write range (S151; no). Therefore, the control circuit 11 changes the valid cluster count VCC associated with the valid cluster count unit VCCU0 to which the cluster CST belongs from "1" to "2" (S152).

Thereafter, the control circuit 11 writes valid data in the non-volatile memory 20 (S153). In addition, the control circuit 11 stores the physical address of the valid data to the LUT entry associated with the cluster CST1 (S154).

Thereafter, the control circuit 11 returns a response to the write command to the host 2 (S127).

4. Effects According to Embodiment

According to the embodiment, the memory controller 10 executes the trim processing at the granularity of the clusters CST in response to the trim command from the host 2. The memory controller 10 updates the valid cluster counts VCC for each valid cluster count unit VCCU. The memory controller 10 calculates the sum (NUSE) of the valid cluster counts VCC in the namespace NS. In a case where the target range (internal trim range) of the trim processing is not smaller than the segment SEG, the memory controller 10 can return a response including the calculated sum (NUSE) to the host 2 before executing the trim processing. As a result, it is possible to manage the calculated sum (NUSE) with high accuracy while shortening the response time to the NUSE information acquisition command from the host 2.

To supplement the description, it is necessary to determine the presence or absence of valid data at the granularity of the clusters CST in order to accurately grasp the amount of valid data in a state where the trim processing is postponed. However, in a case where the above-described determination is performed on all the clusters CST, it may take time to respond to the NUSE information acquisition command from the host 2.

According to the embodiment, in a case where the internal trim range is smaller than the segment SEG, the memory controller 10 invalidates the LUT entries for each cluster CST included in the internal trim range. The memory controller 10 calculates the valid cluster counts VCC based on the invalidation having been executed.

In a case where the target range of the trim processing is not smaller than the segment SEG and is smaller than the valid cluster count unit VCCU, the memory controller 10 determines whether valid data is stored in each cluster CST included in the internal trim range without invalidating the LUT entries. The memory controller 10 calculates the valid cluster counts VCC based on a result of the determination.

In a case where the target range of the trim processing is not smaller than the valid cluster count unit VCCU, the memory controller 10 does not invalidate the LUT entries for the target range. The memory controller 10 sets the valid cluster counts VCC associated with the valid cluster count units VCCU within the target range to "0" without performing the determination for each cluster CST.

A method of calculating an NUSE according to a comparative example will be described. In the comparative example, valid clusters on LUT entries are counted to calculate the NUSE. Therefore, in a case where trim processing has been postponed, an accurate NUSE cannot be calculated until the trim processing is completed. Therefore, there is a case where a correct NUSE cannot be responded to a NUSE information acquisition command from the host 2.

In the present embodiment, even in a state where the trim processing is postponed, it is possible to update the valid cluster counts VCC and calculate the NUSE. As a result, it is possible to calculate the valid cluster counts VCC with less error as compared with the calculation method of the comparative example while shortening the response time to the NUSE information acquisition command from the host 2.

As the size of each of the valid cluster count units VCCU approaches the segment SEG, the speed of calculating the valid cluster counts VCC increases, but the size of the VCC information 32 increases. On the other hand, as the size of each of the valid cluster count units VCCU approaches the namespace allocation unit NSAU, the speed of calculating the valid cluster counts VCC decreases, but the size of the VCC information 32 decreases. In the embodiment, the size of each of the valid cluster count units VCCU can be arbitrarily set in a range from the segment SEG to the namespace allocation unit NSAU. As a result, the response time and the size of the volatile memory 30 can be balanced.

While certain embodiments have been described, these embodiments have been presented by way of example only, and are not intended to limit the scope of the invention. Indeed, the embodiments described herein may be embodied in a variety of other forms; furthermore, various omissions, substitutions and changes in the form of the embodiments described herein may be made without departing from the spirit of the inventions. The embodiments and modifications are included in the scope and spirit of the invention and are included in the scope of the claimed inventions and their equivalents.

What is claimed is:
1. A memory system comprising:
a non-volatile memory; and
a memory controller configured to allocate a logical address range to a namespace in a first unit and release the logical address range from the namespace in the first unit, wherein
the first unit includes one or more second units, and each of the one or more second units includes a plurality of third units, and
the memory controller, in response to a first command from a host giving an instruction on invalidation of data stored in a first logical address range designating one or more of the third units, is configured to:
invalidate the data for each of the one or more third units;

manage, for each of the one or more second units, a first count that is a number of third units in which valid data is stored among the plurality of third units;

in response to a second command from the host requesting a sum of the one or more first counts associated with the one or more second units included in the first unit allocated to the namespace, calculate the sum;

detect that the first logical address range is not smaller than each of the one or more fourth units; and in response to detecting that the first logical address range is not smaller than each of the one or more fourth units, transmit the sum to the host as a response to the second command before invalidating the data, wherein each of the one or more second units includes one or more fourth units, and the one or more fourth units include the plurality of third units.

2. The memory system according to claim 1, wherein the memory controller is configured to specify at least one of the one or more second units including the one or more third units designated by the first logical address range, and in a case where a range that is not smaller than each of the one or more fourth units and is smaller than the second unit is designated by the first logical address range, the memory controller is configured to:

determine whether valid data is stored in each of the third units; and update the first count based on a result of the determination.

3. The memory system according to claim 2, wherein the memory controller is configured to:

determine whether valid data is stored in each of the third units for the second unit included in the first logical address range; and subtract, from the first count, the number of the third units determined to store the valid data.

4. The memory system according to claim 2, wherein the memory controller is configured to:

determine whether valid data is stored in each of the third units for the second unit not included in the first logical address range; and update the first count to the number of the third units determined to store the valid data is stored.

5. The memory system according to claim 1, wherein each of the one or more second units includes one or more fourth units, and the one or more fourth units include the plurality of third units, and the memory controller is configured to:

specify at least one of the one or more second units including the one or more third units designated by the first logical address range; and transmit the sum to the host as a response to the second command after invalidating the data in a case where the first logical address range is smaller than each of the one or more fourth units in the specified second unit.

6. The memory system according to claim 1, wherein the memory controller is configured to manage, for each of the plurality of fourth units, information indicating whether or not a third unit for which data invalidation has not been executed is included among the one or more third units designated by the first logical address range.

7. The memory system according to claim 1, wherein in a case where the first logical address range is not smaller than each of the one or more second units, the memory controller is configured to update the one or more first counts associated with the one or more second units that are all included in the first logical address range to zero before invalidating the data.

8. The memory system according to claim 7, wherein in response to a second command from the host requesting a sum of the one or more first counts associated with the one or more second units included in the first unit allocated to the namespace, the memory controller is configured to;

calculate the sum before invalidating the data; and transmit the sum to the host as a response to the second command.

9. A method of controlling a memory system including a non-volatile memory, the method comprising:

allocating a logical address range to a namespace in a first unit, the first unit including one or more second units, each of the one or more second units including a plurality of third units;

releasing the logical address range from the namespace in the first unit;

receiving a first command from a host giving an instruction on invalidation of data stored in a first logical address range designating one or more of the third units;

invalidating the data for each of one or more third units;

managing, for each of one or more second units, a first count that is a number of third units in which valid data is stored among the plurality of third units;

receiving a second command from the host requesting a sum of the one or more first counts associated with the one or more second units included in the first unit allocated to the namespace;

in response to receiving the second command, calculating the sum;

detecting that the first logical address range is not smaller than each of the one or more fourth units; and in response to detecting that the first logical address range is not smaller than each of the one or more fourth units, transmitting the sum to the host as a response to the second command before invalidating the data, wherein each of the one or more second units includes one or more fourth units, and the one or more fourth units include the plurality of third units.

10. The method according to claim 9 further comprising:

specifying at least one of the one or more second units including the one or more third units designated by the first logical address range;

detecting that a range which is not smaller than each of the one or more fourth units and is smaller than the second unit in the specified second unit is designated by the first logical address range;

in response to detecting that the range is designated by the first logical address range, determining that valid data is stored in each of the third units; and in response to determining that the valid data is stored in each of the third units, updating the first count based on a result of the determination as to the valid data.

11. The method according to claim 10 further comprising:

determining that valid data is stored in each of the third units for the second unit included in the first logical address range; and in response to determining that the valid data is stored in each of the third units for the second unit included in the first logical address range, subtracting, from the first count, the number of the third units determined to store the valid data.

12. The method according to claim 10 further comprising:
determining that valid data is stored in each of the third units for the second unit not included in the first logical address range; and
in response to determining that the valid data is stored in each of the third units for the second unit not included in the first logical address range, updating the first count to the number of the third units determined to store the valid data.

13. The method according to claim 9 further comprising:
managing, for each of the plurality of fourth units, information indicating a third unit for which data invalidation has not been executed is included among the one or more third units designated by the first logical address range.

14. The method according to claim 9, wherein
each of the one or more second units includes one or more fourth units, and the one or more fourth units include the plurality of third units, and the method further comprises:
specifying at least one of the one or more second units including the one or more third units designated by the first logical address range;
detecting that the first logical address range is smaller than each of the one or more fourth units in the specified second unit; and
in response to detecting that the first logical address range is smaller than each of the one or more fourth units in the specified second unit, transmitting the sum to the host as a response to the second command after invalidating the data.

15. The method according to claim 9 further comprising:
detecting that the first logical address range is not smaller than each of the one or more second units; and
in response to detecting that the first logical address range is not smaller than each of the one or more second units, updating the one or more first counts associated with the one or more second units that are all included in the first logical address range to zero before invalidating the data.

16. The method according to claim 15 further comprising:
receiving a second command from the host requesting a sum of the one or more first counts associated with the one or more second units included in the first unit allocated to the namespace;
in response to receiving the second command, calculating the sum before invalidating the data; and
transmitting the sum to the host as a response to the second command.

* * * * *